(No Model.)
2 Sheets—Sheet 1.

G. C. WOOSTER.
SCALE BEAM.

No. 564,496. Patented July 21, 1896.

WITNESSES:
M. S. Bloudel
Edw. W. Byrn.

INVENTOR
G. C. Wooster.
BY Munn & Co.
ATTORNEYS.

(No Model.) 2 Sheets—Sheet 2.

G. C. WOOSTER.
SCALE BEAM.

No. 564,496. Patented July 21, 1896.

WITNESSES:
M. D. Blondel
Edw. W. Byrn

INVENTOR
G. C. Wooster
BY Munn & Co
ATTORNEYS.

THE NORRIS PETERS CO., PHOTO-LITHO., WASHINGTON, D. C.

UNITED STATES PATENT OFFICE.

GAYLORD C. WOOSTER, OF RULO, NEBRASKA.

SCALE-BEAM.

SPECIFICATION forming part of Letters Patent No. 564,496, dated July 21, 1896.

Application filed August 28, 1895. Serial No. 560,807. (No model.)

*To all whom it may concern:*

Be it known that I, GAYLORD C. WOOSTER, of Rulo, in the county of Richardson and State of Nebraska, have invented a new and useful Improvement in Scale-Beams, of which the following is a specification.

My invention relates to improvements in and attachments to the beams of scales used in weighing commodities where there is a second or tare weight to be deducted from first weight, so that the exact net weight will be immediately indicated as soon as the tare is placed upon the scale-platform. The net weight is indicated both in net pounds and in bushels and fractions of a bushel, of any given weight per bushel, without any mathematical calculation.

The objects of my improvement are, first, to remove all necessity for subtracting the tare weight from the gross weight in order to ascertain the net weight of a load; second, to indicate at the same time the exact number of bushels and fractions of a bushel of any kind of grain that has been removed from the load after first or gross weight was taken, without calculation, thereby avoiding errors in calculations; and, third, to have fractions of bushels shown in fourths or tenths, so that in the addition of a number of loads of any kind of grain which has been weighed by my beam the parts of bushels may be treated decimally, thus avoiding the necessity for reducing the parts of bushels into bushels, as is necessary where the fractional parts of a bushel are indicated in pounds. I attain these objects by the mechanism illustrated in the accompanying drawings, in which—

Figure 1:
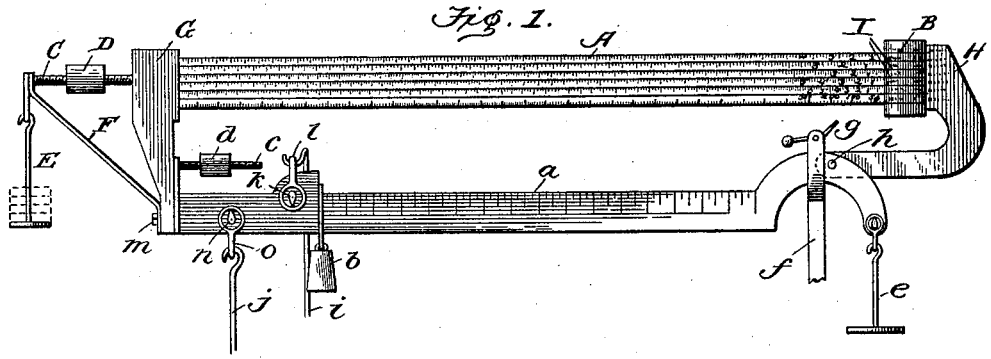
Figure 2:
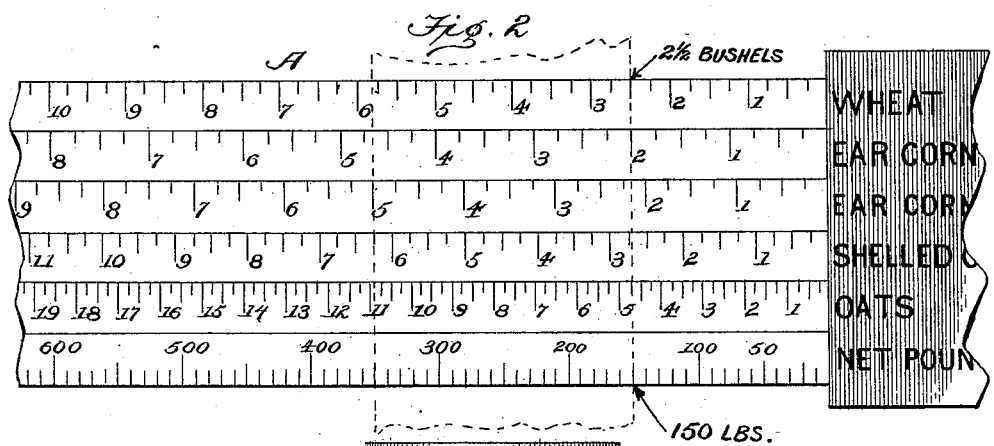
Figure 3:
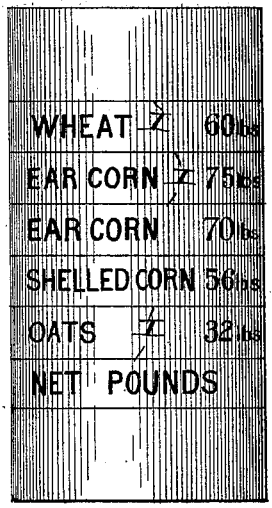
Figure 4:
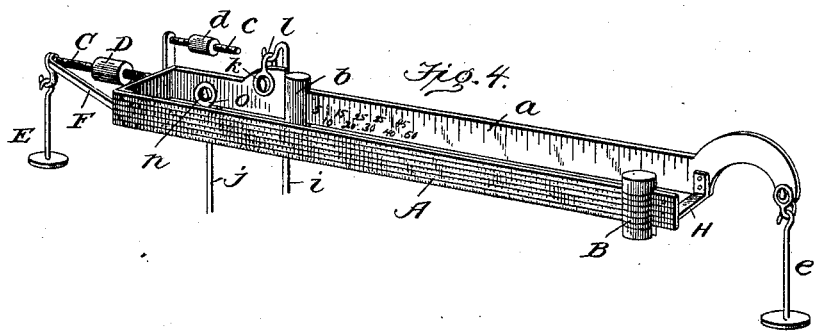
Figure 5:
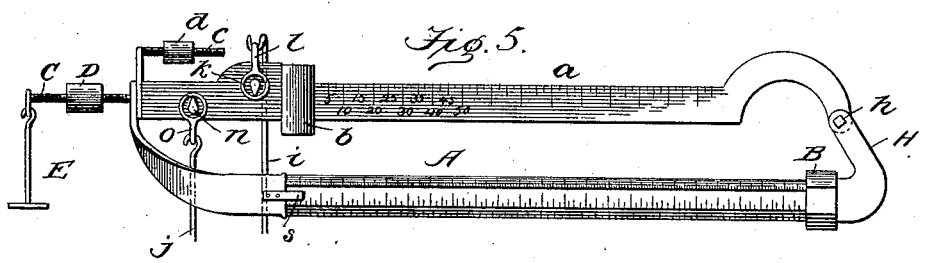

Figure 1 is a side view of the entire device attached to an ordinary scale-beam. Fig. 2 is an enlarged detail of a portion of the beam, showing the mode of indicating weights of various commodities. Fig. 3 is the slotted poise or weight used on the beam on which the various weights for a bushel of grain are shown corresponding to lines of figures on beam, and Figs. 4 and 5 are modifications of the manner of arranging my net-weight beam.

Similar letters refer to similar parts throughout the several views.

In the drawings, A is the supplementary or net-weight beam having bracket G at one end and hooked neck or extension H at the other for connecting with the ordinary scale-beam.

B is the poise for the supplementary beam; C, a screw-rod on its inner end bearing adjustable screw-threaded balance-weight D.

E is a hanger attached to outer end of screw-rod and designed to receive balance-weights coöperating with D.

F is a brace extending from lower end of bracket G to outer end of screw-rod C.

I are horizontal subdivisions on the poise B, bearing the names of various commodities and their respective weights to the bushel, said subdivisions coinciding with corresponding horizontal subdivisions on the beam A.

The above parts are applied to the ordinary or main scale-beam $a$, having poise $b$, screw-rod $c$, balance-weight $d$, hanger $e$, standard $f$, hinged latch $g$, bolt $h$ to connect net-weight beam, standard $i$, with suspension hook or fork, pull-rod $j$, connecting with scale-levers, fulcrum $k$, clevis $l$, bolt $m$, connecting-beam bracket G, fulcrum $n$, and clevis $o$.

The beam A, composed of any suitable metal, is attached to the beam $a$ in the most practical manner, either directly above, as shown, or alongside, or in any other position, but in such a manner as to work in uniformity with but in no way interfere with the balancing of the beam $a$. The beam A is numbered on its scale to read from right to left. The poise or weight B when extended to extreme outer or right-hand end of beam A is understood to stand at zero, and from this point toward the left the beam B is numbered and scaled according to the different weights of various commodities.

When poise B is extended to the extreme right-hand or outer end of beam A, and poise $b$ of the ordinary scale-beam $a$ is placed at the extreme left-hand or inner end of beam $a$, the scale is intended to balance, and the beams move freely up and down when the platform of scale has no load upon it.

The manner of balancing my beam when attached to a scale directly over the ordinary beam is by the addition of sufficient weights at the hanger E, as shown in dotted lines, to overcome the weight of A and B when B is extended to zero. To render the balance perfect, the screw-threaded balance-poise D is adjusted along the screw-threaded rod C.

I prefer to carry out my invention by the use of a horizontal beam of metal constructed in the form of a flat bar whose plane is vertical with its face, marked and numbered in several lines, and beginning at the outer or right-hand end and increasing to the left or in the opposite direction to the scale of the beam to which it is attached. This serves to show how much net weight has been removed, as will be hereinafter described.

In illustration we will suppose the device to be in balance and ready to weigh, as in Fig. 1. A loaded wagon containing wheat is driven on the scale and on the regular beam $a$, and by the addition of weights to the hanger $e$ we find the gross weight to be twelve hundred pounds. After removing the wheat the wagon is placed on the scale again and the poise B is pushed to the left till the beam balances. We find, as illustrated in dotted lines in Fig. 2, the poise indicates one hundred and fifty pounds of wheat, equal to two and one-half bushels.

As a modification of my invention the beam A may be attached alongside of beam $a$, as shown in Fig. 4, in which the same mode of maintaining the beams in balance is followed.

I also propose to use a hollow tube for beam A, as in Fig. 5, in place of the flat bar, in which case the tube has eight flat sides or surfaces, each side or surface to be graduated and numbered substantially as set forth on the various lines on the flat bar. In case of the octagon tube being used I hold the ends in place by an axle, so that it could be revolved to expose the desired side for the commodity that was to be weighed, and to prevent it revolving too freely I hold it in place by a friction-spring $s$.

I am aware that scale-beams have been in use whose figures indicated the net bushels as well as pounds prior to my invention; also, that beams of metal, both flat and octagon, have been used upon which were figures to indicate weight. Therefore I do not claim such a combination broadly.

Having thus described my invention, what I claim, and desire to secure by Letters Patent, is—

1. The combination with the main scale-beam $a$, its poise $b$, hanger $e$, and balance-weight $d$, of the detachable beam A arranged parallel to the main scale-beam and directly connected therewith both at its outer and inner ends, said detachable beam being graduated with several horizontal series of marks for different commodities and figured reversely to the main beam, and a separate poise B, screw-stem C, balance-weight D, and hanger E for said detachable beam substantially as and for the purpose described.

2. The combination with a main scale-beam and its coöperating parts; of the detachable beam A having bracket G and hook-shaped neck H connecting it to the main beam and graduated with several horizontal series of marks for different commodities, and figured reversely to the ordinary beam, the poise B, screw-stem C, balance-weight D, hanger E, and brace F, substantially as and for the purpose described.

GAYLORD C. WOOSTER.

Witnesses:
   Jos. A. McDonald,
   J. C. Stephen.